(12) United States Patent
Stimson, III

(10) Patent No.: US 7,071,969 B1
(45) Date of Patent: Jul. 4, 2006

(54) PARAMETERIZED PREVIEW ARRAY FOR ITERATIVE IMAGE OPTIMIZATION IN REMOTE APPLICATIONS

(75) Inventor: John Jacob Stimson, III, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 716 days.

(21) Appl. No.: 09/964,712

(22) Filed: Sep. 27, 2001

(51) Int. Cl.
*H04N 5/225* (2006.01)
*H04N 5/222* (2006.01)
*G01N 23/00* (2006.01)

(52) U.S. Cl. .............................. 348/207.11; 348/333.05; 250/311

(58) Field of Classification Search ........... 348/207.01, 348/207.11, 187, 188, 180, 333.05; 250/311
See application file for complete search history.

(56) References Cited

U.S. PATENT DOCUMENTS

| | | | | |
|---|---|---|---|---|
| 5,426,732 A | * | 6/1995 | Boies et al. ................. | 345/839 |
| 6,324,695 B1 | * | 11/2001 | Lee et al. ..................... | 725/38 |
| 6,677,988 B1 | * | 1/2004 | Usami ........................ | 348/179 |

FOREIGN PATENT DOCUMENTS

| | | | |
|---|---|---|---|
| EP | 992944 A1 | * | 4/2000 |
| EP | 1069764 A2 | * | 1/2001 |
| JP | 64071377 A | * | 3/1989 |

OTHER PUBLICATIONS

John F. Mansfield et al.; "Development of a System to Provide Full, Real-time Remote Control of a Scanning Electron Microscope Across the Second Generation Internet: The Teaching SEM," *Microscopy and Microanalysis*. vol. 6, pp. 31-41, 2000.
Christopher Morgan et al.; "Toward a Standard for Remote Microscope Control Systems," *Scanning*, vol. 20, pp. 110-116, 1998.

\* cited by examiner

*Primary Examiner*—Ngoc-Yen Vu
*Assistant Examiner*—Timothy J. Henn
(74) *Attorney, Agent, or Firm*—Stallman & Pollock LLP

(57) ABSTRACT

A method of adjusting focus and/or other image parameters in a remotely-operated image capturing system, such as a scanning electron microscope (SEM), is provided. The method minimizes transmission bandwidth and allows a remote user to perform adjustment quickly without requiring real-time feedback. In accordance with the method, rather than adjusting a knob or slider while viewing a real-time image as is done in prior art systems, the user selects among several still images representing a wide range of values of the adjustment in question. The user then selects from another set of images which represent a small subrange of values determined by the first choice. The process is repeated until the adjustment resolution of the instrument is reached or the user is satisfied. Adjustments, like objective lens alignment, which require "focus wobble" can also be made using this method. Since focus wobble is a periodic motion, it can be represented using a short loop of animation. This animation, when used in accordance with the present invention, can either be captured directly as a short burst of video or captured as a sequence of still images.

3 Claims, 1 Drawing Sheet

PARAMETERIZED PREVIEW ARRAY FOR ITERATIVE IMAGE OPTIMIZATION IN REMOTE APPLICATIONS

BACKGROUND OF THE INVENTION

I. Field of the Invention

The present invention relates to remotely-operated systems and, in particular, to adjustment of focus and/or other image parameters in a remotely-operated scanning electron microscope (SEM).

II. Discussion of the Related Art

Shared digital resources, such as the shared use of computer-controlled scientific instruments, is a growing field. In particular, remote microscopy is becoming more widely used in research and development within both the academic community and commercial enterprises.

John F. Mansfield et al., "Development of a System to provide Full, Real-time Remote Control of a Scanning Electron Microscope across the Second Generation Internet: The Teaching SEM," *Microscopy and Microanalysis,* Vol. 6, pp. 31–41, 2000, describe a remotely accessed system for utilizing a scanning electron microscope (SEM). The Mansfield et al. solution imitates the exact functionality of the SEM as it would be used by an operator sitting at the console, including a live video image that serves as the basis for controlling the instrument.

Christopher Morgan et al., "Toward a Standard for Remote Microscope Control Systems," *Scanning,* Vol. 20, pp. 110–116, 1998, also describe a real-time full remote-control SEM system. However, the Morgan et al. system is limited to static images only, with image quality adjustment limited to focus only (a single parameter adjustment).

SUMMARY OF THE INVENTION

The present invention provides a method of adjusting focus and/or other image parameters in a remotely-operated scanning electron microscope (SEM) by iteratively stepping through a sequence of still image arrays until the remote user is satisfied with the quality of the image. The method minimizes transmission bandwidth and allows the remote user to perform adjustments quickly without requiring real-time feedback.

As mentioned above, most existing techniques for remotely operating a SEM use a live video feed, which requires either dedicated video cable or television transmission between sites, or a high-speed Internet link. In contrast, rather than requiring adjustment of a knob or a slider while reviewing a live, real-time image, the method of the present invention allows the user to select among several still images representing a wide range of values for the adjustment in question. The user then selects from another set of images which represent a smaller range of values determined by the first choice. This process is repeated until the adjustment resolution of the instrument is reached or the user is satisfied.

Adjustments, like objective lens alignment, that require "focus wobble" (a moving image) can also be made using this method. The adjustment for lens alignment (and sometimes astigmatism) in a SEM is based on evaluation of a moving image in which the focus is "wobbled" back and forth periodically. The present invention provides a method for generating and transmitting such an image with lesser requirements on the network compared to live video feeds. Focus wobble is a periodic motion and, thus, can be represented using a short loop of animation. This animation can either be captured directly as a short burst of video, or captured as a sequence of still images.

A method in accordance with the present invention also generalizes to adjusting two related parameters at once, for example X and Y astigmatism adjustments. Just as a single parameter adjustment can be presented as a sequence of alternatives, the alternatives for a two-parameter adjustment can be presented in a two dimensional grid. This makes the adjustment of astigmatism and lens alignment more straightforward, because the X and Y components of those adjustments are interdependent and must be adjusted together.

Finally, the inventive method allows for rapid adjustment using progressively finer adjustment scales to find the best final value. Each range is subdivided into a handful of subranges, and the "best" subrange becomes the new range of adjustment and is in turn divided into smaller/finer subranges. This allows for the quickest convergence on the optimal adjustment. The user can also exit the process when the adjustment is deemed "good enough."

Thus, the present invention provides a method of remotely adjusting an operating parameter of a computer-controlled image capturing system. A remote user terminal is coupled to the image capturing system via a transmission medium, which may be hardwired or wireless. A parameter range for the operating parameter is then determined. A parameter range is then divided into a plurality of parameter points. The image capturing system then captures an image at each of the plurality of parameter points and transmits captured images to the remote user terminal which are then displayed at the remote user terminal. The remote user then selects a best captured image from the captured images and communicates the identity of the selected best captured image back to the image capturing system. The identity of the selected best captured image causes the image capturing system to determine an updated parameter range that is a subset of the previous parameter range. The updated parameter range is then divided into a plurality of updated parameter points that includes the parameter point associated with the selected best captured image. The foregoing steps are iteratively repeated until a final best captured image is selected at the remote user terminal.

Further features and advantages of the present invention will become apparent from the following detailed description and accompanying drawings which set forth an illustrative embodiment in which the principles of the invention are utilized.

DETAILED DESCRIPTION OF THE INVENTION

Figure 1:
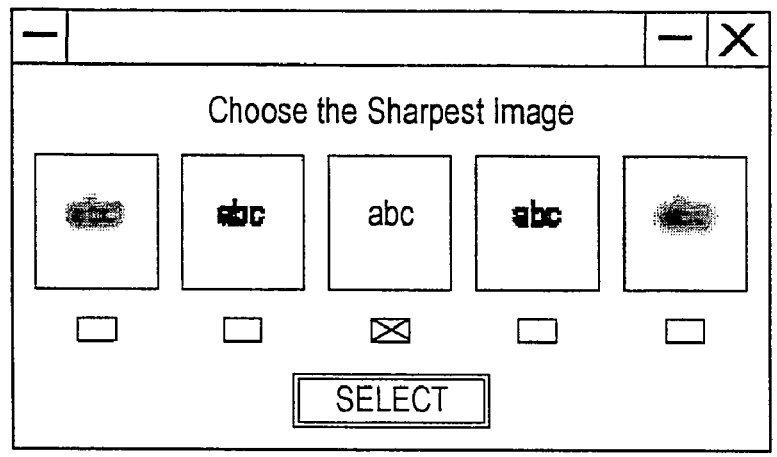
FIG. 1 provides an example of a screen image showing an interface for single-axis parameter optimization in accordance with the present invention.
Figure 2:
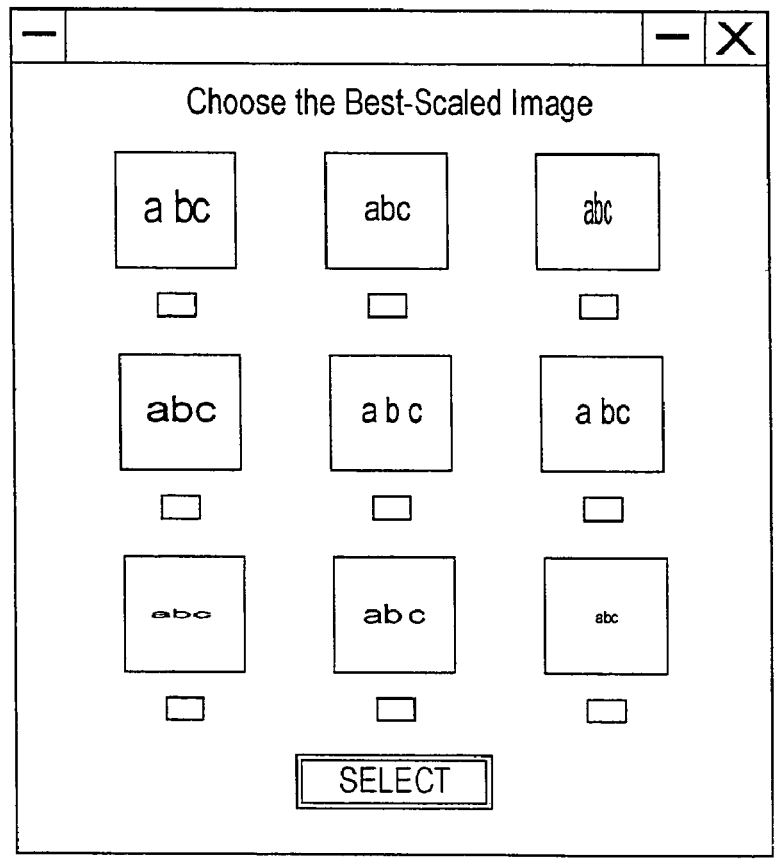
FIG. 2 provides an example of a screen image showing an interface for two-axis parameter optimization in accordance with the present invention.

The following disclosure provides a detailed description of a computer implemented method of adjusting focus and other image parameters in a remotely-operated scanning electron microscope (SEM). The objective is to minimize transmission bandwidth and allow a remote user to perform adjustments quickly without requiring real-time feedback.

The fundamental concept of the present invention is to utilize a "decision tree" wherein the user selects the best image from among several images representing successively finer ranges of adjustment. The space of parameters to be adjusted (generally one or two parameters at a time: focus=1, stigmation=2) is divided into a small number of sample regions. A sample image representing each region is transmitted to the remote user who then selects the best sample. The best sample is then used to select a smaller region of the parameter space and the above procedure is repeated until an acceptable image is achieved.

The sample images can be presented as an array (one or two dimensional), allowing the user to quickly find the best image and select it with a mouse. If an array is not feasible, then providing the user with the ability to switch back and forth between sample images would suffice.

In some cases, proper adjustment requires the use of a dynamic image. For example, adjustment of the objective lens alignment in a scanning electron microscope (SEM) is performed by minimizing image translation when the focus is shifted. A common method is to engage "focus wobble," which ramps the focus up and down over a small range.

In accordance with the present invention, a short animation simulating the focus-wobble sweep replaces the still images. Again, the video samples are presented simultaneously in an array, or a selector control allows the user to choose which sample to view individually. The bandwidth required for transmitting the video samples over the network is minimized by exploiting the periodicity of the samples. Because the focus wobble used for lens alignment is cyclical, a single cycle can be captured and repeated.

The simplest method for capturing a cycle of video is similar to "stop motion" animation, and requires only basic control and communication between the computer controlling the remote adjustment process and the SEM. The range of the focus wobble is split into the number of frames desired for one cycle of the animation, and a focus value is chosen for each frame. Then the frames are captured as still images one at a time, with the SEM being commanded to change to the focus value for the next frame in between each capture. The final animation is then assembled into a single file from the individual frames, to include a forward sequence followed by a reversed sequence. Some image or animation formats may permit this to be done with a single copy of each frame and an instruction to loop forwards and backwards, while other formats may require two copies of each image (one for the upward sequence, one for the downward sequence). This is a somewhat slow, but simple process. Other methods for capturing a single cycle would work equally well in terms of bandwidth reduction, including a triggered live video capture. Such methods could speed up generation of the animations prior to transmission, but require greater control and communication with the SEM.

Several examples of the utilization of the present invention will now be described:

EXAMPLE 1

Focus

A focus range is chosen which represents the typical required adjustment for focus. The range is divided into some number of points (e.g., between 3 and 10). The microscope is instructed to capture an image at each focus point. The images are sent to the user's computer, which displays them in an array or other control panel which allows for rapid viewing of the choices. The user selects the "best" focus point. If the focus point is at the end of the range, a new subrange of the same size or larger is chosen, moved off to one side of the original range and including the selected point as an interior point. If the point chosen is not one of the end points, a smaller range is chosen centered on the selected point. This process is repeated until the user is satisfied with the focus. A control may be included to "back up" to the previous range if the user believes that he/she has selected the wrong point.

The Schlumberger IDS-10000da SEM system allows a focus range of 0–9999. If 10 images are presented at a time, then the correct focus should be found after four selections by the user. The first set of points effectively establishes the 1000s digit, the second set establishes the 100s digit, and so on.

An example session proceeds as follows:

SEM presents images with the following focus values:

0500 1500 2500 3500 4500 5500 6500 7500 8500 9500

The user selects 5500, and the SEM presents these values:

5050 5150 5250 5350 5450 5550 5650 5750 5850 5950

The user selects 5050, and the SEM presents these values:

5005 5015 5025 5035 5045 5055 5065 5075 5085 5095

The user selects 5005, and the SEM presents these values:

5000 5001 5002 5003 5004 5005 5006 5007 5008 5009

The user selects the best image, and the process is complete.

EXAMPLE 2

Astigmatism

This example is similar to the focus example provided above, but because stigmation has two control axis, the range must be two-dimensional, and the sample images should be presented to the user in a two-dimensional array. A good balance between rapid convergence and the ability to display all the choices on-screen would be to divide the X and Y adjustment ranges into thirds or quarters, which results in 9 or 16 alternatives for each choice. In the example of the IDS-1000da system, each stigmation axis ranges from −100 to +100; thus, if the ranges are divided into thirds, the selection should be completed when the user has made three picks.

EXAMPLE 3

Lens Alignment

This adjustment requires moving pictures in order to judge the correct setting. It also has two control axis, like astigmatism. The only difference from the method for astigmatism adjustment is in how the example pictures are created and sent. At each lens alignment point, rather than taking a single image, a series of images is captured representing a low-amplitude sweep of the focus setting. This series of images is assembled into a moving picture and sent to the user's computer for display. The moving picture can either be a real-time video (such as MPEG, AVI, or Quicktime (TM)) captured from the SEM during a focus sweep, or assembled from images captured one at a time at multiple focus settings within the range of the sweep. The latter is the simpler method, with fewer hardware requirements, if the SEM provides such controls. The series of images in this case can be presented as an animated GIF or a motion JPEG image.

EXAMPLE 4

Probe Alignment

A feature which will show errors in vertical and horizontal alignment is placed in a pre-defined region of the SEM image. A full frame of video is captured, followed by a stroboscopic image captured within the alignment window and overlaid on the full-frame SEM image. A method is employed which allows the user to indicate the relative shift between the background image, and the image in the alignment window. The new correction is transmitted back to the SEM. One possible method would be for the user to pick one point in the alignment image, and then pick the corresponding point in the background image. Another method would allow the user to drag the alignment image with the mouse until it lines up with the background image.

Those skilled in the art will appreciate that the methods described above may, in addition to allowing remote control of a SEM imaging system, also allow for easier adjustments of the same parameters for local operation due to their simplicity and clarity.

Thus, it should be understood that various alternatives to the embodiments of the invention described above may be employed in practicing the invention. It is intended that the following claims define the scope of the invention and that methods and structures within the scope of these claims and their equivalents be covered thereby.

What is claimed is:

1. In a computer-controlled image capturing system that includes an imaging device that captures a live video image of a display object and a remote computer terminal connected to the imaging device to receive image data from the imaging device relating to the display object and to transmit control signals to the imaging device, a method of remotely adjusting an operating parameter of the imaging device, the method comprising:
   (a) determining a parameter value range for the operating parameter;
   (b) dividing the parameter value range into a plurality of operating parameter values,
   (c) transmitting a parameter control signal from the remote computer terminal to the imaging device that causes the image capture system to capture a plurality of still images, each still image corresponding to the live video image captured when the imaging device is operating at a corresponding one of the plurality of operating parameter values;
   (d) simultaneously displaying the plurality of still images,
   (e) selecting a preferred still image from the plurality of displayed still images;
   (f) determining an updated parameter value range for the operating parameter based upon the operating parameter value associated with the selected preferred still image;
   (g) dividing the updated parameter value range into a plurality of updated operating parameter values;
   (h) transmitting an updated parameter control signal from the remote computer terminal to the imaging device that causes the image capture system to capture a plurality of still images, each updated still image corresponding to the live video image captured when the imaging device is operating at a corresponding one of the plurality of updated operating parameter values;
   (i) repeating steps (d)–(h) above with respect to iteratively updated operating parameter value ranges until a final still image is selected; and
   (j) transmitting a final parameter control signal from the remote computer terminal to the imaging device such that the imaging device captures a final live video image using the updated operating parameter control value associated with the selected final still image.

2. In a computer-controlled image capturing system that includes an imaging device that captures a live video image of a display object and a remote computer terminal connected to the imaging device to receive image data from the imaging device relating to the display object and to transmit control signals to the imaging device, a method of adjusting an operating parameter of the imaging device, the method comprising:
   (a) determining a parameter value range for the operating parameter;
   (b) dividing the parameter value range into a plurality of operating parameter values;
   (c) transmitting a parameter control signal form the remote computer terminal to the imaging device that causes the image capture system to capture a plurality of video motion loops, each video motion loop corresponding to the live video image captured when the image device is operating at a corresponding one of the plurality of operating parameter values;
   (d) simultaneously displaying the plurality of video motion loops;
   (e) selecting a preferred video motion loop from the plurality of displayed video motion loops;
   (f) determining an updated parameter value range for the operating parameter based upon the operating parameter value associated with the selected preferred video motion loop;
   (g) dividing the updated parameter value range into a plurality of updated operating parameter values;
   (h) transmitting an updated parameter control signal from the remote computer terminal to the imaging device that causes the image capture system to capture a plurality of video motion loops, each updated video motion loop corresponding to the live video image captured when the imaging device is operating at a corresponding one of the plurality of updated operating parameter values;
   (i) repeating steps (d)–(h) above with respect to iteratively updated operating parameter value ranges until a final video motion loop is selected; and
   (j) transmitting a final parameter control signal from the remote computer terminal to the imaging device such that the imaging device captures a final live video image using the updated operating parameter control value associated with the selected final video motion loop.

3. In a computer-controlled image capturing system that includes an imaging device that captures a live video image of a display object and a remote computer terminal connected to the imaging device to received image data from the imaging device relating to the display object and to transmit control signals to the imaging device, a method of adjusting an operating parameter of the imaging device, the method comprising:
   (a) determining a parameter value range for the operating parameter;
   (b) dividing the parameter value range into a plurality of operating parameter values;
   (c) transmitting a parameter control signal from the remote computer terminal to the imaging device that causes the image capture system to capture a plurality of still image sequences, each still image sequence corresponding to the live video image captured when the image device is operating at a corresponding one of the plurality of operating parameter values;

(d) assembling each of the plurality of still image sequences into a corresponding moving picture;

(e) simultaneously displaying the plurality of moving pictures;

(f) selecting a preferred moving picture from the plurality of moving pictures;

(g) determining an updated parameter value range for the operating parameter based upon the operating parameter value associated with the selected preferred moving picture;

(h) dividing the updated parameter value range into a plurality of updated operating parameter values;

(i) transmitting an updated parameter control signal from the remote computer terminal to the imaging device that causes the image capture system to capture an updated plurality of still image sequences, each updated still image sequence corresponding to the live video image captured when the imaging device is operating at a corresponding one of the plurality of updated operating parameter values;

(j) repeating steps (d)–(i) above with respect to iteratively updated operating parameter value ranges until a final preferred moving picture is selected; and (k) transmitting a final parameter control signal from the remote computer terminal to the imaging device such that the imaging device captures a final live video image using the updated operating parameter control value associated with the final preferred moving picture.

\* \* \* \* \*

UNITED STATES PATENT AND TRADEMARK OFFICE
CERTIFICATE OF CORRECTION

PATENT NO. : 7,071,969 B1
APPLICATION NO. : 09/964712
DATED : July 4, 2006
INVENTOR(S) : John Jacob Stimson, III Page 1 of 1

It is certified that error appears in the above-identified patent and that said Letters Patent is hereby corrected as shown below:

In Column 6, line 38, change "plurality of video motion loops," to --plurality of updated video motion loops,--

Signed and Sealed this

Twenty-ninth Day of August, 2006

JON W. DUDAS
*Director of the United States Patent and Trademark Office*